Patented Apr. 4, 1950

2,503,077

UNITED STATES PATENT OFFICE 2,503,077

PERHALOGENATED ETHYLCYCLOPENTANE

Frederic B. Stilmar, Woodstown, and William S. Struve, Carneys Point, N. J., and Ralph N. Lulek, Silverside Heights, Del., assignors to the United States of America as represented by the United States Atomic Energy Commission No Drawing. Application December 20, 1945, Serial No. 636,260

4 Claims. (Cl. 260—648)

This invention relates to organic halogen derivatives and their manufacture.

The invention has for its objects the provision of new fluorocarbons and chloro-substituted fluorocarbons having unusual stability and capable of use over a wide range of temperatures and in contact with a variety of chemical reagents without undergoing decomposition, rearrangement, polymerization, or chemical reaction. A further object is the provision of new methods of manufacturing the products of the invention.

The compounds of the present invention are liquids at normal temperatures and may be distilled at normal atmospheric pressure without use of steam or inert gases or vapors as aids to distillation. They are suitable for use at heat transfer liquids and as constant-boiling heating or cooling baths, and are especially suitable for use under conditions such that ordinary hydrocarbons are undesirably or dangerously unstable or reactive with other materials present. They are especially valuable for use as direct contact cooling agents and diluents for chemical reactions involving reactants either miscible or immiscible therewith. They are valuable as sealants in liquid seals for confining highly reactive vapors or gases. They have a high electrical resistivity and hence are suitable for use as temperature regulators in electrical transformers and as spark dampers in circuit breakers, and for other purposes where a combination of high electrical resistivity and chemical stability are required.

The compounds of the present invention are derivatives of ethylcyclopentane having the hydrogen atoms of the hydrocarbon replaced by fluorine atoms or fluorine and chlorine atoms.

While the compounds of the present invention were first prepared by methods involving fluorination of chlorinated intermediates, it is convenient to regard the products containing chlorine as chloro-substitution products of the completely fluorinated compound, perfluoro-ethylcyclopentane

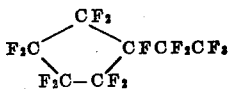

The class of compounds within the purview of the invention may be represented by the general molecular formula, $C_7F_xCl_{14-x}$, wherein $x$ represents a positive integer from 1 to 14 inclusive.

The parent fluorocarbon, perfluoro-ethylcyclopentane, has a boiling point of approximately 73° C., and its chlorine derivatives have progressively higher boiling points with increasing chlorine content; thus the monochloro derivatives $C_7ClF_{13}$ have boiling points in the neighborhood of 100° C., the dichloro derivatives $C_7Cl_2F_{12}$ have boiling points in the neighborhood of 125° C. and the polychloro derivatives have still higher boiling points.

There are several methods available for preparing the products of the present invention and the most appropriate method for preparing a particular compound of the group depends to some extent upon the relative numbers of fluorine and chlorine atoms which it contains.

The compounds of the present invention may be prepared from monohydro-perfluoro-ethyl-cyclopentanes and the monohydro-chloro derivatives thereof, $C_7HF_xCl_{(13-x)}$, $x$ being a positive integer not greater than 13, and corresponding unsaturated compounds, by means of a fluorinating agent capable of replacing a solitary organic hydrogen atom, e. g. cobalt trifluoride, silver difluoride, manganese trifluoride, or elemental fluorine. This fluorination may be conducted in liquid or vapor phase at temperatures between about 150° C. and about 500° C., preferably between 150° C. and 350° C. for the liquid phase processes and between 300° C. and 500° C. for the vapor phase processes.

The monohydro-perfluoro- and monohydro-chloroperfluoro-ethylcyclopentanes of the general molecular formula $C_7HF_xCl_{(13-x)}$ and a process for making them constitute the subject of our U. S. patent application Serial Number 636,261 entitled "Cyclic compounds and methods of making" filed on the same date herewith. As described therein these compounds may be prepared by fluorinating with a pentavalent antimony halide fluorinating agent a condensation product obtained by condensing one mol of hexachloropropene with 2 mols of trichlorethene or by condensing one mol of carbon tetrachloride with 3 mols of trichlorethene, using anhydrous aluminum chloride as condensation catalyst at about 80° C., washing the condensation product with water to remove the catalyst, and then fractionally distilling to separate the organic compounds boiling below about 120° C. from the desired products, $C_7H_2Cl_{12}$ and $C_7HCl_{11}$.

The cobalt trifluoride treatment or its equivalent replaces residual hydrogen by fluorine, and also effects complete saturation of any unsaturated constituents to yield perfluoro-ethylcyclopentane or a chloro-substituted perfluoro-ethylcyclopentane. When treating intermediates containing only one or two chlorine atoms in the molecule, the products normally contain as many residual chlorine atoms as present in the intermediate treated in this step. When treating intermediates containing three or more chlorine atoms, some of the chlorine also may be replaced by fluorine in this step, yielding products including compounds with the same number of chlorine atoms and compounds with a lower number of chlorine atoms.

If it is desired to produce only the fluorocarbon, the antimony halide fluorination step may be carried to a point where a relatively small amount of chlorine derivatives remains, or after the hydrogen replacement, the fluorocarbon may be separated from chlorine derivatives by fractional distillation or other suitable method, and chlorine derivatives may be separately treated with additional antimony pentafluoride to convert these derivatives to the chlorine-free compound.

The following examples illustrate the manufacture of the products of the present invention. Quantities are expressed as parts by weight.

EXAMPLE 1

Part A 1575 parts of a 2-carbon-side-chain dodecachloroheptene (prepared by condensing one mol of hexachloropropene with two mols of trichlorethylene and separating the product of 84–86° C. melting point) was mixed with 1000 parts of anhydrous $SbCl_5$ and 2700 parts of anhydrous HF and the mixture was heated to 150° C. in a steel autoclave. The pressure was kept at 400–450 pounds gauge by bleeding the excess gas through a brine-cooled dephlegmator. When no further evolution of gas occurred at 150° C., the autoclave charge was cooled to 20° C. and 2700 parts of anhydrous HF was added. The charge was then heated to 150° C. and the pressure was maintained at 400–450 pounds as before. When gas ceased to evolve, the charge was cooled to 50° C. and excess HF was distilled off through a dephlegmator maintained at a temperature of about 40° C. The fluorination product was then distilled from the autoclave at 10 mm absolute pressure. The vapor temperature rose during the distillation to a final temperature of 170° C. 647 parts of distillate was recovered. The distillate was washed with water, dried and calcium chloride, and redistilled at atmospheric pressure. 503 parts of a yellow oil of boiling range 110–200° C., mostly boiling between 135° and 200° C., was obtained. The product had a chlorine content (28% Cl) corresponding to the average formula $C_7HCl_3F_{10}$; its boiling range indicates that it included $C_7HCl_2F_{11}$ compounds as well as the trichloro compound. The distillation residue had an average composition corresponding to $C_7HCl_4F_9$. Both the distillate and residue were not completely saturated and were considered to include compounds of the general formulae $C_7HCl_2F_9$, $C_7HCl_3F_8$, and $C_7HCl_4F_7$.

A mixture of 60 parts of a fraction boiling from 118° to 200° C. obtained as described in the preceding paragraph, and 200 parts of anhydrous $SbF_5$ was heated at 180° C. for two hours in an aluminum-lined bomb. The mixture was then cooled and poured into a mixture of ice and dilute hydrochloric acid. The organic layer was separated, washed acid-free with water and fractionally distilled at atmospheric pressure. 12 parts of a fraction boiling from 63.5° to 67° C. and 13 parts of a fraction boiling from 90° to 100° C. were obtained. The major portion of the first fraction boiled between 64° and 65° C. and comprised $C_7HF_{13}$; the major part of the 90° to 100° C. fraction boiled between 92° and 95° C. and comprised $C_7HClF_{12}$.

Part B 47 parts of a $C_7HF_{13}$ fraction boiling from 64° to 65° C. at atmospheric pressure and obtained by refractionating a 63.5° to 67° fraction produced as described in Part A was brought in vapor phase into contact with $CoF_3$ maintained at 400° C. The product was condensed, vaporized, and again passed into contact with $CoF_3$, this time at 475° C. The product was washed with water, separated from the wash-water, and distilled fractionally. 27.5 parts of a perfluoroethylcyclopentane product was obtained boiling between 72.5° and 74° C. at atmospheric pressure. The density of the product and its refractive index (sodium D-line) measured on the Abbé refractometer were as follows: $D_{20°/20°}$—1.7555; $N_D^{20}$—1.276.

Part C 200 parts of a $C_7HClF_{12}$ fraction of boiling range 92° to 95° C. and obtained by refractionating a 90° to 100° C. fraction obtained as in Part A was passed into contact with 266 parts of $CoF_3$ at 400° C. in a period of 1½ hours. The product was again passed into contact with the $CoF_3$ twice more at the same temperature. Each passage was effected with the organic material in vapor phase. The product was washed with water, separated from wash-water, and fractionally distilled. 65 parts of a monochloroperfluoroethylcyclopentane fraction was obtained boiling between 100° and 102° C. at atmospheric pressure and having a density (20°/4°) of 1.804 and a refractive index of 1.305.

EXAMPLE 2

Part A 3085 parts of the branched-chain seven-carbon product of condensation of three mols of trichlorethylene and one mol of carbon tetrachloride was fluorinated by two successive additions of anhydrous HF of 2700 parts each in the presence of 2000 parts of $SbCl_5$, in the manner described in Example 1. Upon redistillation of the product at atmospheric pressure, the following fractions were obtained:

| Vapor Temperature | Distillate |
|---|---|
| | Parts |
| Below 130° C | 63 |
| 130° C.–200° C | 881 |
| Above 200° C | 481 |

The fraction distilling from 130° to 200° C. is considered to comprise compounds of the general formulae $C_7HCl_2F_9$, $C_7HCl_3F_8$, $C_7HCl_4F_7$, $C_7HCl_2F_{11}$, $C_7HCl_3F_{10}$, and $C_7HCl_4F_9$.

A mixture of 60 parts of the 130°–200° C. fraction and 200 parts of $SbF_5$ was heated for two hours at 180° C. in an aluminum-lined bomb. Distillation of the crude organic product yielded 2 parts of a $C_7HF_{13}$ fraction boiling from 56° to 67° C. and 16 parts of a $C_7HClF_{12}$ fraction boiling from 90° to 100° C.

Part B

From the $C_7HF_{13}$ fraction and the $C_7HClF_{12}$ fraction prepared in Part A, the perfluoro-ethylcyclopentane and its monochloro derivative are prepared in the same manner as described in Example 1, Part B and Part C.

Example 3

By the procedure of Example 1, Part B or C applied to a $C_7HCl_2F_{11}$ fraction, for example, a 110°–120° C. or a 100°–130° C. cut recovered from a fluorination product obtained in the HF fluorination step of Example 1, Part A, or Example 2, Part A, a dichloroperfluoro-ethylcyclopentane product (considered to be a mixture of isomers differing from one another in respect to the positions of the chlorine atoms) may be obtained boiling at 128°–130° C. and having a refractive index of 1.332 and a density (20°/4°) of 1.703.

Example 4

A halogenated hydrocarbon fraction containing mainly $C_7HCl_2F_9$, and $C_7HCl_3F_{10}$ compounds obtained by the process outlined in Example 1, Part A, had an average chlorine content of 30%. 85 parts of this fraction was mixed with 100 parts of $CoF_3$ and heated for three hours at 150° C. in a nickel bomb. 73 parts of a product with boiling range from 130° to 188° C. was obtained. 60 parts of this product was heated with 92 parts of $CoF_3$ at 225° C. for 4 hours in a bomb at autogenous pressure, giving 45 parts of product having a boiling range of 135° to 190° C. and a chlorine content corresponding to an average composition $C_7Cl_3F_{11}$. The product is considered to be mainly a mixture of isomeric trichloroperfluoro-ethyl-cyclopentanes, differing from one another in respect to the positions occupied by the chlorine atoms, with some compounds of higher and lower chlorine contents present.

By similar treatment of the 135°–200° fraction produced in Example 1, a mixture of chloro-perfluoro-ethylcyclopentanes may be produced from which the several products may be separated by fractional distillation.

It should be borne in mind that the intermediate chlorofluoro compositions are normally mixtures of isomers resulting from variation in the positions of chlorine substituents. Hence from the standpoint of isolating individual chloro-perfluoro-ethylcyclopentanes it is advantageous to treat a fraction of narrow boiling range. For purposes where this is not a desideratum it is expeditious to work with relatively broad cuts.

It will be understood that we intend to include variations and modifications of the invention and that the preceding examples are illustrations only and in no wise to be construed as limitations upon the invention, the scope of which is defined in the appended claims, wherein we claim:

1. As a new chemical compound a perhalogenated ethylcyclopentane of the molecular formula $C_7Cl_xF_{14-x}$, wherein $x$ has a value from 0 to 3.

2. As a new chemical compound, perfluoroethylcyclopentane having a boiling point of about 73° C. a density of about 1.75 and a refractive index of about 1.28.

3. As a new chemical compound, a monochloroperfluoro-ethylcyclopentane having a boiling point of about 101° C. a density of about 1.80 and a refractive index of about 1.30.

4. As a new chemical compound, a dichloroperfluoro-ethylcyclopentane having a boiling point of about 129° C. a density of about 1.70 and a refractive index of about 1.33.

FREDERIC B. STILMAR.
WILLIAM S. STRUVE.
RALPH N. LULEK.

REFERENCES CITED

The following references are of record in the file of this patent:

UNITED STATES PATENTS

| Number | Name | Date |
| --- | --- | --- |
| 2,005,708 | Daudt et al. | June 18, 1935 |
| 2,423,045 | Passino et al. | June 24, 1947 |
| 2,456,027 | Simons | Dec. 14, 1948 |